United States Patent
Kurt

(10) Patent No.: US 7,576,915 B2
(45) Date of Patent: Aug. 18, 2009

(54) DISPLAY DEVICE

(75) Inventor: Ralph Kurt, Eindhoven (NL)

(73) Assignee: Koninklijke Philips Electronics N.V., Eindhoven (NL)

( * ) Notice: Subject to any disclaimer, the term of this patent is extended or adjusted under 35 U.S.C. 154(b) by 282 days.

(21) Appl. No.: 10/596,446

(22) PCT Filed: Nov. 24, 2004

(86) PCT No.: PCT/IB2004/052534

§ 371 (c)(1), (2), (4) Date: Jun. 14, 2006

(87) PCT Pub. No.: WO2005/059636

PCT Pub. Date: Jun. 30, 2005

(65) Prior Publication Data

US 2008/0285135 A1    Nov. 20, 2008

(30) Foreign Application Priority Data

Dec. 17, 2003   (EP)   ................................. 03104741

(51) Int. Cl.
*G02B 5/02*   (2006.01)
(52) U.S. Cl. .................. 359/599; 359/620; 362/618
(58) Field of Classification Search ......... 362/615–619; 359/40–42, 599, 620, 626
See application file for complete search history.

(56) References Cited

U.S. PATENT DOCUMENTS 5,462,700 A * 10/1995 Beeson et al. .............. 264/1.27
5,521,726 A * 5/1996 Zimmerman et al. .......... 349/96
6,538,813 B1 * 3/2003 Magno et al. ............... 359/443

FOREIGN PATENT DOCUMENTS

CN    1126520 A    7/1996

OTHER PUBLICATIONS

Chinese Office Action issued on Sep. 14, 2007 to be placed in the file but not considered by the Patent Office.

* cited by examiner

*Primary Examiner*—John A Ward
(74) *Attorney, Agent, or Firm*—Lowe Hauptman Ham & Berner, LLP

(57) ABSTRACT

A display device comprises a light emitting picture element (120) and a contrast enhancing element (110). The contrast enhancing element comprises a plurality of wave guides (216) separated by interstitial regions (212) being formed as narrowing recesses. An interface between a wave guide (216) and an interstitial region (212) is provided with a reflective layer. The narrowing recesses form a dead end for incident ambient light which is efficiently absorbed by the contrast enhancing element. On the other hand, light emitted by the picture element (120) of the display device is transmitted through the wave guides (216). As a result, the display device has a relatively high contrast ratio, particularly under bright ambient light conditions.

10 Claims, 1 Drawing Sheet

DISPLAY DEVICE

Figure 1:
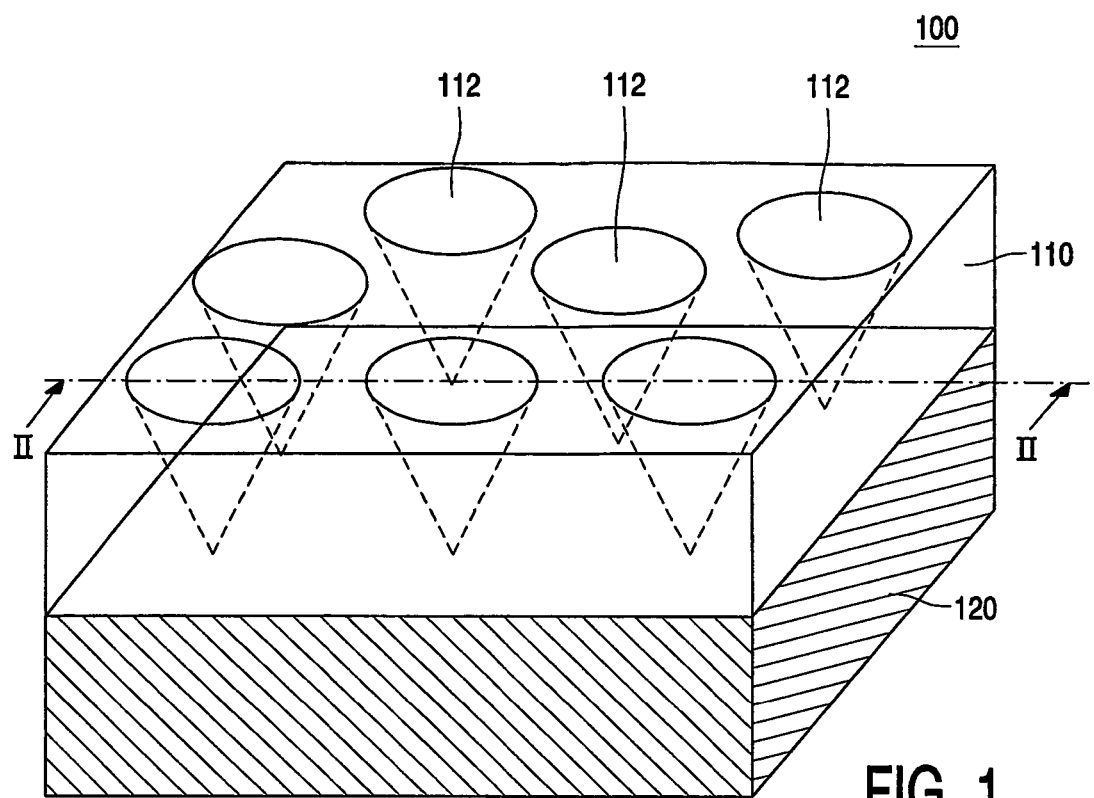

The invention relates to a display device.

Display devices, such as televisions and monitors are widely applied. It is important that the quality of the image on the display is as good as possible. For this reason, display manufacturers constantly seek to improve display characteristics such as image brightness, colour saturation, and contrast ratio.

The contrast ratio of a displayed image is defined as the ratio between the brightness of a picture element of the display in its brightest (white) and darkest (black) state.

It is well known that the contrast ratio can be adversely affected when the display is placed under bright external light conditions, although some reflective types of displays used for mobile applications actually favour such light conditions, since they use the ambient light as a light source for the image to be displayed.

But in general, for any emissive display such as a CRT or polymer LED display, or when a display incorporates its own light source, such as a transmissive LCD which incorporates a backlight system, the contrast of the displayed image deteriorates under bright light conditions, since the ambient light enters the display through the screen and is reflected from elements and/or surfaces within the display. For such displays, the reflected light causes the black state of the display to be brightened, since the viewer now perceives stray light being undesirably reflected to him. Moreover, the reflections cause unwanted and unpredictable effects, i.e. artefacts and distortions are experienced by the user. As a result, the contrast ratio is lowered.

Many solutions have been proposed to improve the contrast ratio. For example, in emissive displays black matrix absorbing material is often used enclosing the emissive elements, such as the phosphors of a CRT. This has the drawback that the emitters themselves, covering a relatively large surface area, still reflect incident stray light, so that the improvement in contrast ratio is relatively limited. Another approach uses a combination of a polariser and a quarter lambda plate, which is quite effective in suppressing reflection of ambient light. However, such solutions also absorb a relatively large part of the light emitted by the display's picture elements, so that the improvement in contrast ratio is still rather limited as the intensity of the bright display stated is negatively affected.

U.S. Pat. No. 5,481,385 discloses a display substrate with an array of tapered waveguides, where the regions between the waveguides can be filled with a light absorptive (black) material. Light emitted from the picture elements is guided through the waveguides, while ambient light is incident on the array of waveguides and absorbed by the light absorptive material. However, the material is in direct contact with the waveguides leading in excess absorption loss to light transmitted through the waveguides. This effect can be reduced by using particulate black matrix material, but the benefits of this solution are still relatively limited.

It is an object of the invention to provide a display device with a contrast enhancing means, so that displayed image has a particularly high contrast ratio, especially under bright external light conditions.

This object has been achieved by means of the display device as specified in the independent Claim 1. Further advantageous embodiments are given in the dependent Claims.

The invention is based on the following recognition:

A structure of geometric elements having a shape narrowing towards the picture element can be indented into a flat substrate. Inside the narrowing recesses thus formed, a reflective layer, preferably a metal layer is deposited.

The inventors have found that, if such recesses are packed sufficiently close to each other and their diameter is sufficiently small, the substrate is a particularly efficient light absorber for light that enters the substrate on the side comprising the relatively wide entrances of the narrowing recesses. Even when observed under bright ambient light conditions, the substrate appears dark black. A dark black state results in a high contrast ratio.

A contrast enhancing element as in the display device of the present invention can easily be formed from such a substrate. In this case, the substrate is to be manufactured from a light transmitting first material such as glass or polymer, preferably with a high reflective index, so that the portions of the substrate that remain after forming the narrowing recesses, act as wave guides for light emitted from a picture element of the display device. Neighbouring wave guides are separated by a narrowing recess, which is also referred to as 'interstitial region' hereinafter.

Light emitted by the picture element enters a wave guide through an entrance surface, which is a base plane of the geometric structure, and propagates through the wave guide.

Furthermore, an exit surface needs to be defined on the wave guides. For this purpose, the top portion of the substrate is removed, after the reflective layer has been provided inside the narrowing recesses. Thus, the wave guides have an exit surface that is substantially free from reflective material and preferably substantially parallel to the entrance surface.

By itself, the reflective material on the interface between the wave guides and the interstitial regions is an efficient reflector for visible light. In fact, when ambient light that entered into a narrowing recess is incident onto such an interface, only between 2 and 10 percent of the incident light is absorbed by the metal, and the majority is reflected.

As stated in the above, the substrate with the reflective geometric elements was nevertheless found to be a highly efficient absorber. The number of reflections of incident light inside a recess becomes relatively high, especially as the recesses become narrower towards the picture element, so that a particularly high fraction of incident light is ultimately absorbed. It is assumed that, as the diameter of an interstitial region and thus the distance between neighbouring wave guides approaches the wavelengths of light in the visible range, an additional absorption effect occurs, based on excitation of surface plasmons.

As a result, the narrowing recesses are a dead end for incident ambient light, and the contrast enhancing element in the display device according to the invention absorbs a particularly high fraction of such light. Problems with stray light are minimized and a black state of the display appears relatively dark. Moreover, the reflective material on the interface between the recesses and the wave guides hardly affects total internal reflection inside the wave guides, so that a particularly high fraction of light emitted by the picture elements is guided through the wave guide and transmitted. A white state of the display appears relatively bright.

As a result, the contrast ratio of a display device according to the invention is relatively high, especially under bright ambient light conditions.

The contrast enhancing element of the present display device is relatively easy to manufacture. A layer of a transparent material is placed adjacent the light emitting picture elements of the display device. The geometric structures can preferably be formed by means of so-called soft lithography, i.e. embossing the desired narrowing recesses in a liquid layer which is subsequently solidified in a curing step. Alternatively, a selective etching process can be used, or a process of polymerizing of monomer containing material on a master. Subsequently the top-end of the wave guides can be removed for instance by mechanical polishing, or a wet chemical process. The wave guides thus formed have exit surfaces that are preferably substantially smaller than the entrance surfaces adjacent the picture element. In this case, ambient light is only reflected back towards a viewer from the relatively small surface area of the exit planes. Thus, the black state of the display is particularly dark and the contrast ratio is particularly high.

Preferably, the reflective layer covers at least a substantial part of the interface between the interstitial region and the wave guides. More preferably, the tapered elements are entirely coated with metal on the inside.

Preferably, the narrowing recesses, i.e. interstitial regions, have a tapered shape, more preferably a funnel shape.

There are various parameters that affect the effectiveness of light absorption by the contrast enhancing element in the present display, such as the density of the geometric structures on the surface, the packing density, the top angle of the structures and the size of the exit plane.

Preferably, top angle of a narrowing recess is, on average, less than 90 degrees. That is, the angle of an interface with the normal direction of the external surface of the contrast enhancing element, which angle will be referred to as α hereinafter, is less than 45 degrees. The angle α is indicated as such in FIG. 2, and the top angle of a tapered recess thus equals 2α.

More preferably, α is between 15 and 30 degrees, and thus the top angle is between 30 and 60 degrees. Thus, the narrowing recesses are relatively sharp, i.e. the length is larger than a cross-sectional diameter of the entrance of a recess.

While light absorption by the contrast enhancing filter generally increases with decreasing top angle due to higher absorption efficiency of the interstitial regions, it was found that for top angles lower than 30 degrees the filter may have an effect on the viewing angle of the display. In this case, the wave guiding of the emitted light is disturbed and hence emission from the wave guides is no longer isotropic. That is, the intensity distribution becomes strongly angular dependent limiting the viewing angle. This is generally detrimental. However, some applications exist, such as security displays, that benefit form a very limited viewing angle. In these cases top angles lower than 30 degrees might be envisaged.

Preferably, the thickness of the contrast enhancing element, i.e. the dimension of the waveguides in a direction parallel to the normal direction, is between 100 nm and 10 µm. Given this height and an angle α in the preferred range, the geometry of the structure is such that several hundreds or thousands of wave guides are provided for each picture element of the display.

The size of the exit surface area of a wave guide can be determined by varying the height above the substrate surface where the top ends of the wave guides are cut off. Preferably, an average diameter of the exit surface area is in the order of magnitude of a wavelength of light in the visible spectrum. Thus, for example, the diameter may be 1 or 2 µm, or more preferably about 500 nm or less.

In this case, emission from the wave guides is nearly isotropic, and the contrast enhancing means does not or hardly limit the viewing angle of the display. Thus, relatively small top angles can be used without effect on the viewing angle. Moreover, the exit surface of the wave guides, from which ambient light is reflected, constitutes a particularly small part of the surface of the display device facing the viewer, so that the amount of stray light is reduced even further.

Preferably, the plurality of wave guides, and thus the narrowing recesses in the substrate, are arranged in a random structure. This further reduces the influence of the contrast enhancing means on the display viewing angle, and also precludes the occurrence of interference and/or moiré effects in the displayed image.

As stated by way of introduction, a display device according to the invention, incorporating a contrast enhancing filter as described in the above, can be one of many types of display devices having light emitting picture elements.

For example, the display device can be an organic LED display, either polymer LED (P-LED) or small molecule OLED, where the light emitting picture elements comprise a light emitting organic material, a transmissive LCD having backlit picture elements, or any type of vacuum fluorescent display having picture elements including light emitting phosphors, such as a CRT, Field Emission Display or plasma display.

Generally, the contrast enhancing element is arranged on a viewer side of the display, however care should be taken that the distance between the picture elements and the contrast enhancing element is not too large, preferably not larger than a few millimeters, otherwise cross-talk may occur and separation of the primary colors may thereby be adversely affected.

The interstitial regions comprise a second material having a refractive index lower than that of the first material of the wave guides. The second material may be air having a refractive index of about 1, but more preferably, the tapered recesses comprise a protective material having a refractive index close to one, such as 1.1 or 1.05.

The protective material protects the interstitial regions and particularly the sensitive reflective layer on the interface between interstitial region and wave guide. The refractive index of the material should be low in order to largely prevent reflections of ambient light on the surface of the material in the interstitial regions, which reflections would degrade the contrast ratio. Suitable materials for this purpose include aerosol materials, or polymers mixed with such aerosol materials.

Figure 2:
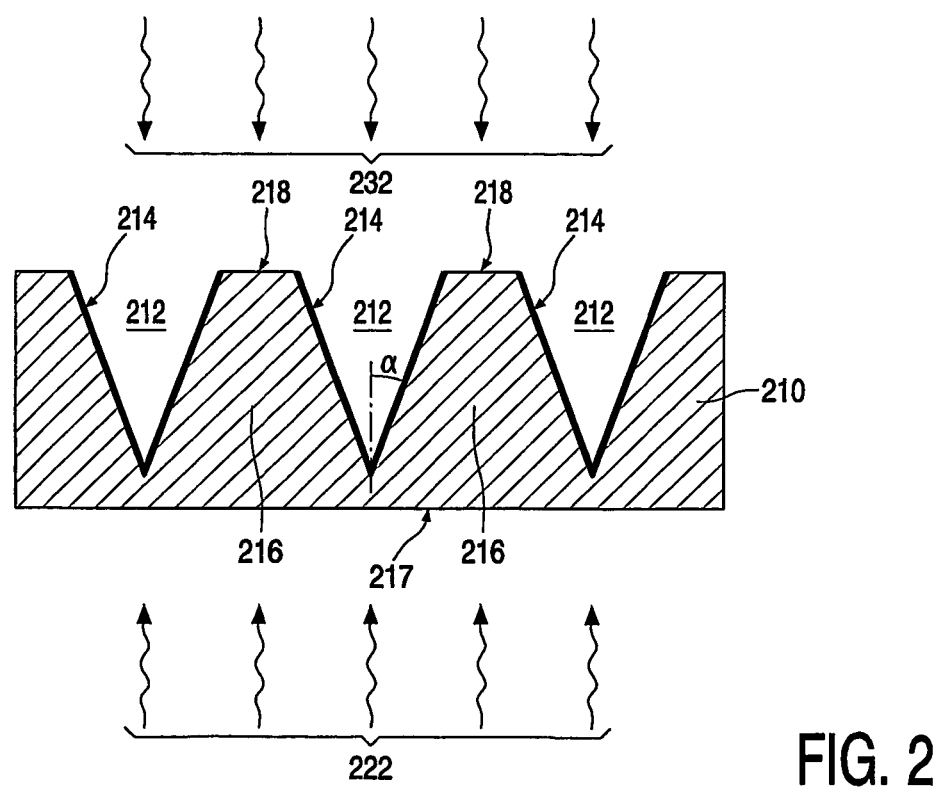

These and other aspects of the invention will now be elucidated further with reference to the accompanying drawings. Here:

FIG. 1 shows an embodiment of a picture element of a display device according to the invention, and FIG. 2 shows a cross-section view along line II-II of the contrast enhancing filter in said embodiment of the display device.

A display device 100 according to the invention comprises a display panel 120. The display panel 120 is of a conventional light emitting type, such as an O-LED or P-LED display panel, a transmissive LCD panel incorporating a backlight system, a CRT screen, a plasma display panel or a field emission display (FED). FIG. 1 depicts a single picture element (pixel) of the display panel 120, or a single color sub-pixel in case of a color display panel.

A contrast enhancing filter 110 is mounted on a viewer side of the display panel 120. The filter includes a plurality of tapered recesses 112 which are funnel-shaped in the present embodiment. The filter 110 between the tapered recesses 112 is suitably formed so as to act as a wave guide for light emitted from the pixel of display panel 120, and in general is formed from a transmissive material.

The tapered recesses 112 can easily be formed by means of so-called soft lithography, i.e. embossing the desired narrowing recesses in a liquid layer which is subsequently solidified in a curing step.

The master stamp, used to define the recesses in the liquid layer, could for example be manufactured by ion bombardment of highly indexed metal crystals, as described in the article by R. Reiche and W. Hauffe, "Pyramid formation on a high index copper bicrystal during bombardment with 10 keV argon and krypton ions", Applied Surface Science 165 (2000), p. 279-287. In this way, a metal stamp is formed that has a surface covered with pyramids. The pyramids indent the tapered recesses in the liquid layer.

Alternatively, a selective etching process can be used, or a process of polymerizing of monomer containing material on a master.

Instead of the round funnels shown in FIG. 1, alternative tapered shaped may be envisaged for recesses 112, such as elliptical, square or rectangular funnel shapes.

FIG. 2 shows a cross-section view of the contrast enhancing filter 210 along the line II-II as indicated in FIG. 1. The tapered recesses 212 form interstitial regions between wave guides 216 in the substrate, and a reflective layer 214, preferably a thin metal layer, is provided on the interfaces between a recess 212 and an adjacent wave guide 216. The layer essentially covers the entire area of the interface.

Such a thin metal layer, for example a silver layer, can be applied using well-known evaporating or sputtering techniques. The thickness of the coating is determined by penetration depth (k-value). A thickness of 10-100 nm is sufficient for the desired effect.

Light 222 emitted by the pixel of the display panel enters the contrast enhancing filter 210, passing through entrance surface 217 into the wave guides 216, and is efficiently transmitted therethrough and emitted through exit surface 218. The exit surface 218 of the wave guides 216 is substantially free from reflective material, in order to have a transmissivity that is as high as possible.

On the other hand, ambient light 232 falling onto the display device from the viewer side mainly enters into the recesses 212 and is efficiently absorbed as set out earlier. A small fraction of ambient light 232 is reflected off the exit surface 218 of the wave guides 216. To ensure that this fraction is as small as possible, the exit surface 218 should be made small in comparison to the surface area occupied by the entrance of the recesses 212. Thus, the black state of the display is particularly dark and the contrast ratio is particularly high. Also, a relatively small exit surface 218 of the wave guides ensures isotropic light emission by the wave guides 216.

Apart from the area occupied by the exit surface 218 of the wave guides 216, the effectiveness of ambient light absorption by the contrast enhancing filter 110 in the present display is, determined by several other parameters as well. These include the size of the tapered recesses and the top angle of the recesses.

As set out earlier, the top angle (2α) of funnel-shaped recesses 212 is preferably between 30 and 60 degrees. Thus, the length of the funnel-shaped recesses 212 in the normal direction is larger than a cross-sectional diameter of a funnel entrance. A smaller top angle may be applied in case a limited viewing angle is not an issue, such as in a security display.

The length of the funnel-shaped recesses 212 in the normal direction is generally similar to the thickness of the contrast enhancing filter 210, as the distance between emitter and entrance surface of the wave guides 216 has to be small in order to prevent parallax effects and, in a color display, crosstalk between different subpixels.

The recesses 212 are dimensioned such that there are several hundreds or thousands of funnel-shaped recesses per pixel of the display panel 120. Thus, a cross-section diameter of an entrance to a funnel-shaped recess 212 is a few micrometers or less, and a length of a recess 212 is therefore at most 10 micrometers for the preferred top angle range.

In order to prevent mechanical damage of the contrast enhancing filter 110, especially the reflective layer 214 inside recesses 212, a smooth surface towards the viewer is preferred. Therefore, it is preferred that funnel-shaped recesses 212 are filled out with a low refractive index material. That is, the refractive index should in any case be lower than that of the substrate material to ensure proper guiding of the emitted light 222 in wave guides 216 mostly by total internal reflection, and preferably be close to one in order to avoid backreflection from an interface between air and the low refractive index material in recesses 212. The material to be applied is preferably a polymer material and more preferably includes aerosol materials.

As an alternative or in addition thereto, an additional flat glass substrate coated with anti-reflective coatings could be placed on top of the contrast enhancing filter 110.

In summary, a display device comprises a light emitting picture element and a contrast enhancing element. The contrast enhancing element comprises a plurality of wave guides separated by interstitial regions being formed as narrowing recesses. An interface between a wave guide and an interstitial region is provided with a reflective layer. The narrowing recesses form a dead end for incident ambient light which is efficiently absorbed by the contrast enhancing element. On the other hand, light emitted by the picture element of the display device is transmitted through the wave guides. As a result, the display device has a relatively high contrast ratio, particularly under bright ambient light conditions.

The invention claimed is:

1. A display device (100), comprising:
 a light emitting picture element (120); and
 a contrast enhancing element (110), the contrast enhancing element comprising a substrate having a plurality of wave guides (216), the wave guides including a first material of a first refractive, index adjacent said picture element (120), and interstitial regions (212) including a second material of a lower refractive index than the first refractive index, the interstitial regions (212) being arranged between the wave guides (216) and formed narrowing in the direction of the picture, element; and
 a reflective layer (214) provided on an interface between a wave guide (216) and an interstitial region (212), wherein the reflective layer is configured to reflect ambient light entering the interstitial regions between the wave guides;
 wherein a cross-section length of an exit surface of a wave guide is in the order of magnitude of a wavelength of light in the visible range.

2. The display device of claim 1, wherein the interstitial regions (212) have a tapered shape.

3. The display device of claim 1, wherein an entrance plane (217) of the plurality of wave guides (216) is arranged for receiving light emitted from said element, a surface area of an exit plane (218) of said plurality of wave guides (216) being substantially smaller than a surface area of said entrance plane.

4. The display device of claim 1, wherein said reflective layer is a metal layer.

5. The display device of claim 1, wherein the interstitial regions are substantially funnel-shaped.

6. The display device of claim 1, wherein the top angle of an interstitial region (212) has a top angle (2*a*) of less than 90 degrees.

7. The display device of claim 6, wherein the top angle lies between 30 and 60 degrees.

8. The display device of claim 1, wherein a thickness of the wave guide substrate is between 100 nanometers and 10 micrometers.

9. The display device of claim 1, wherein the plurality of wave guides and/or the interstitial regions are arranged in a random structure.

10. The display device of claim 1, wherein the display device comprises one of a polymer light emitting display, organic light emitting display, transmissive liquid crystal display, cathode ray tube, plasma display or field emission display.

* * * * *